(12) United States Patent
Chettiar

(10) Patent No.: US 12,266,969 B2
(45) Date of Patent: Apr. 1, 2025

(54) SIMULTANEOUS PARALLEL CHARGING IN UNINTERRUPTIBLE SERIES DISCHARGING ENERGY STORAGE SYSTEMS

(71) Applicant: Kannappan Karuppan Chettiar, Gilroy, CA (US)

(72) Inventor: Kannappan Karuppan Chettiar, Gilroy, CA (US)

( * ) Notice: Subject to any disclaimer, the term of this patent is extended or adjusted under 35 U.S.C. 154(b) by 4 days.

(21) Appl. No.: 18/523,985

(22) Filed: Nov. 30, 2023

(65) Prior Publication Data

US 2024/0186819 A1    Jun. 6, 2024

Related U.S. Application Data

(60) Provisional application No. 63/429,623, filed on Dec. 2, 2022.

(51) Int. Cl.
*H02J 7/00*    (2006.01)
*H02J 7/34*    (2006.01)
*H02J 9/06*    (2006.01)

(52) U.S. Cl.
CPC ............ *H02J 9/061* (2013.01); *H02J 7/0019* (2013.01); *H02J 7/007182* (2020.01); *H02J 7/34* (2013.01); *H02J 2300/24* (2020.01)

(58) Field of Classification Search
CPC .... H02J 9/061; H02J 7/0019; H02J 7/007182; H02J 7/34; H02J 2300/24; H02J 7/00; H02J 9/06
USPC .......................................................... 307/43
See application file for complete search history.

(56) References Cited

U.S. PATENT DOCUMENTS

2021/0218251 A1*   7/2021   Chettiar ................ H02J 7/0024

* cited by examiner

*Primary Examiner* — Elim Ortiz
*Assistant Examiner* — Xuan Ly
(74) *Attorney, Agent, or Firm* — Maier & Maier, PLLC

(57) ABSTRACT

A solution to the challenge of maintaining uninterrupted power supply to the load while charging batteries simultaneously from a power source such as renewable energy. This is achieved by arranging batteries in a series-pack configuration connected to the load and allowing parallel charging of a subset of batteries within the series-pack. The incorporation of interchangeability using low frequency switching ensures a seamless and uninterrupted flow of electrical energy.

19 Claims, 17 Drawing Sheets is an exemplary embodiment of a DPDT switch (Off State) used to charge a series-stacked battery system to power 24V load using a 12V power source.

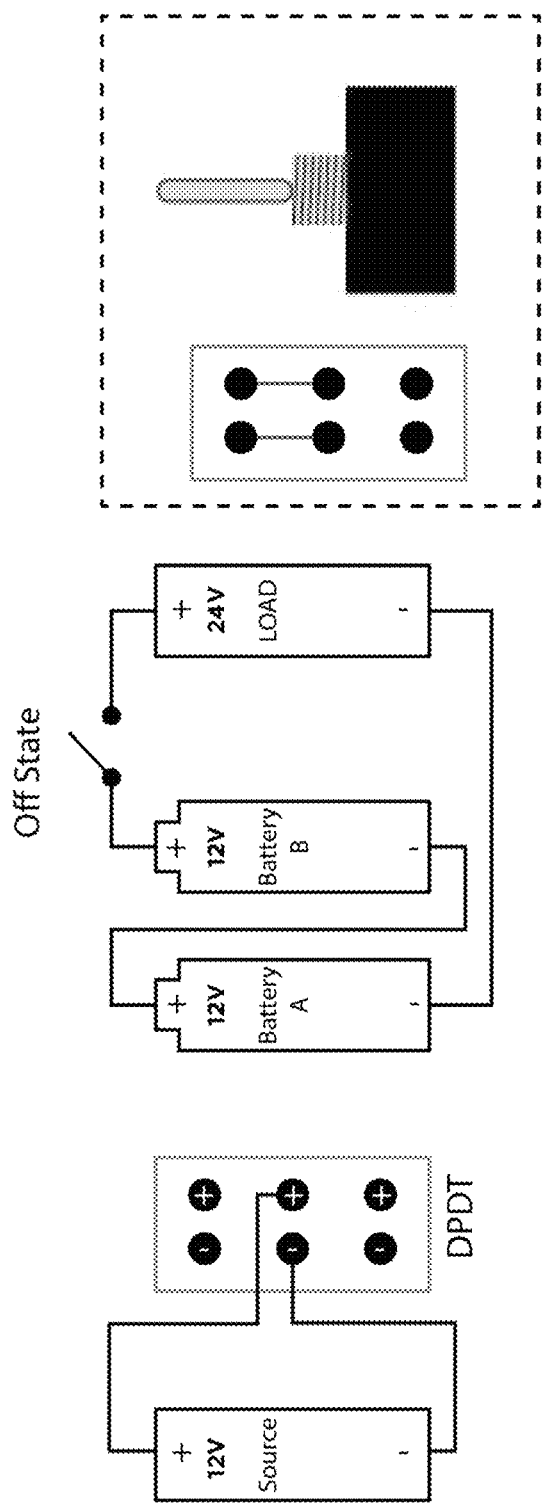
FIG. 1A is an exemplary embodiment of a DPDT switch (Off State) used to charge a series-stacked battery system to power 24V load using a 12V power source.

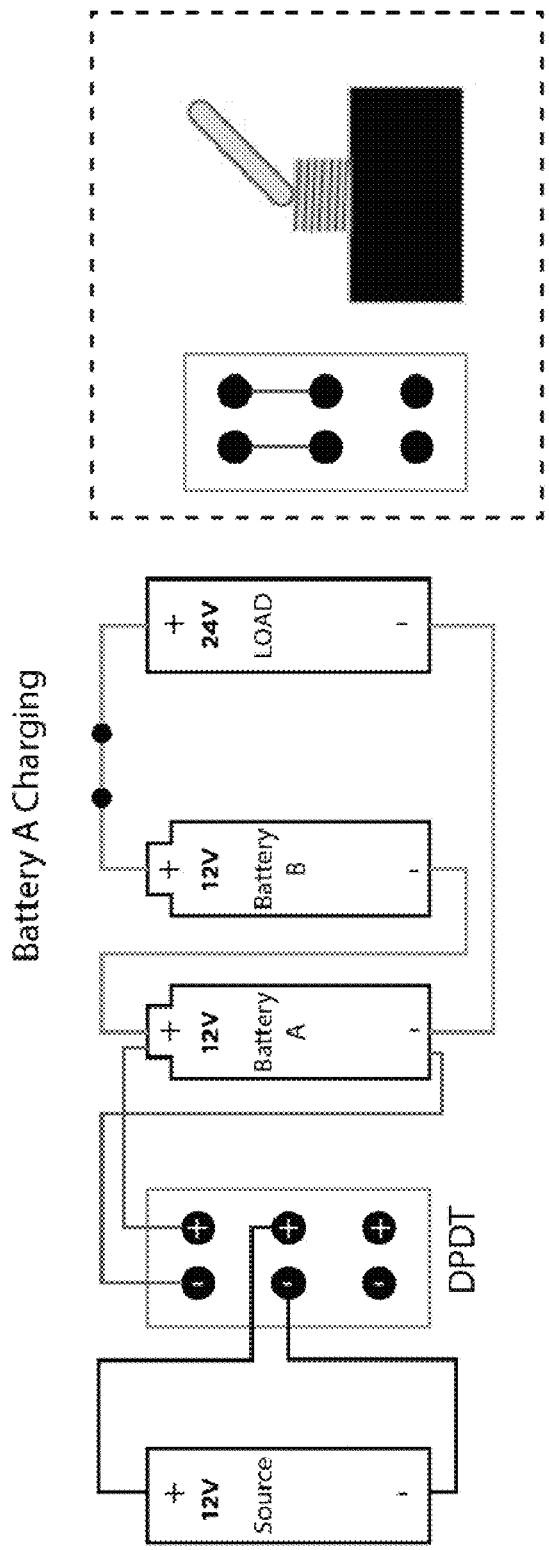
FIG. 1B is an exemplary embodiment of a DPDT switch (First Position) used to charge a series-stacked battery system to power 24V load using a 12V power source.

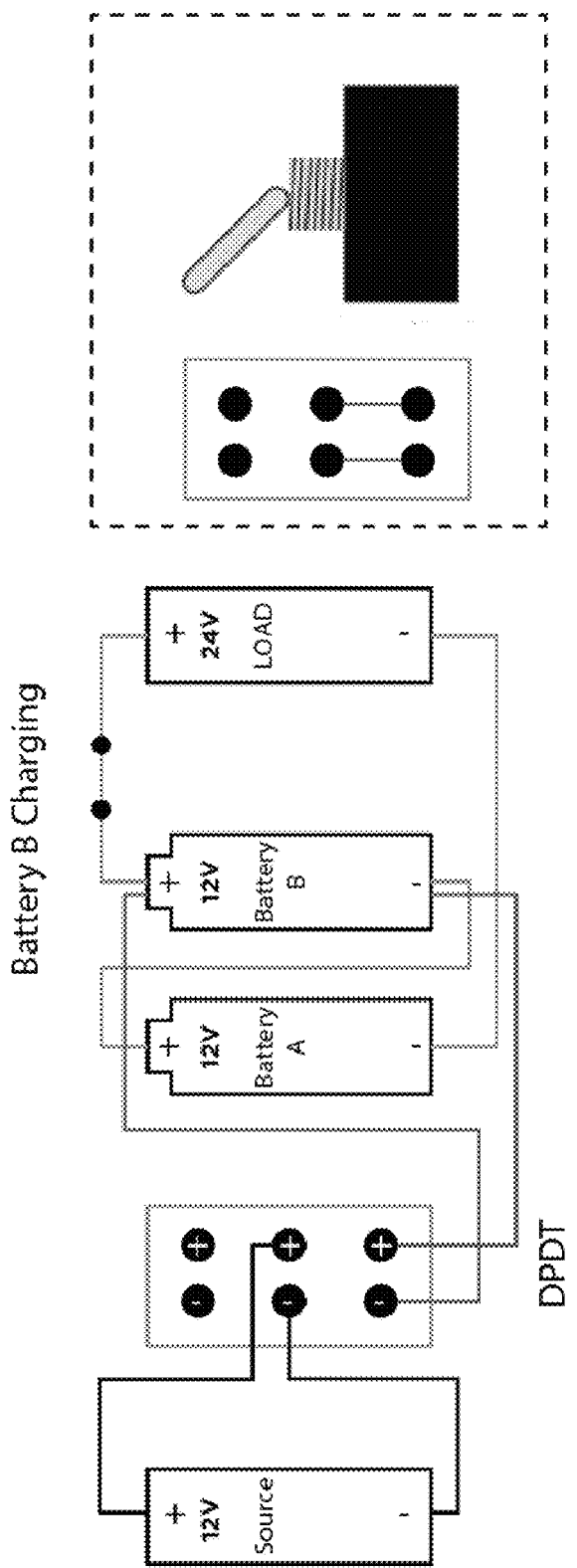
FIG. 1C is an exemplary embodiment of a DPDT switch (Second Position) used to charge a series-stacked battery system to power 24V load using a 12V power source.

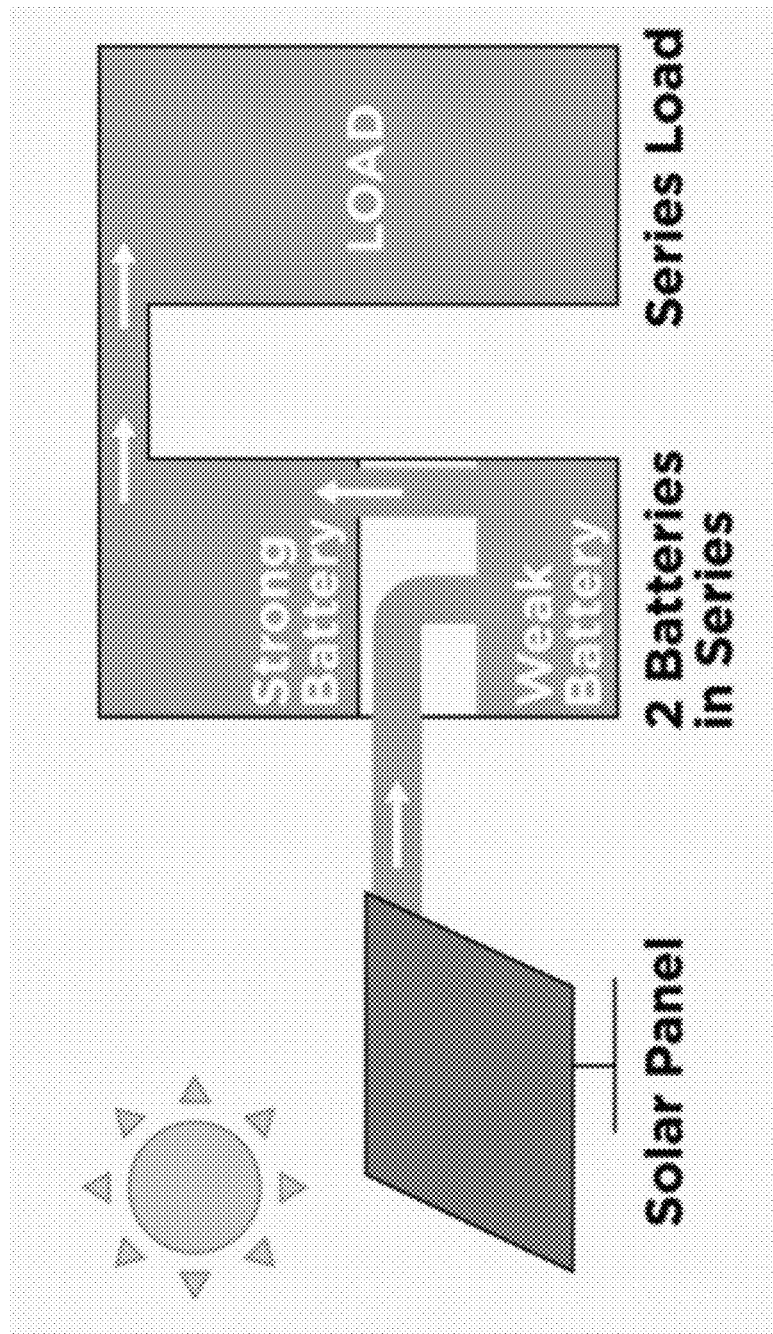
FIG. 2 is a water tank analogy to illustrate the integrated charging and balancing.

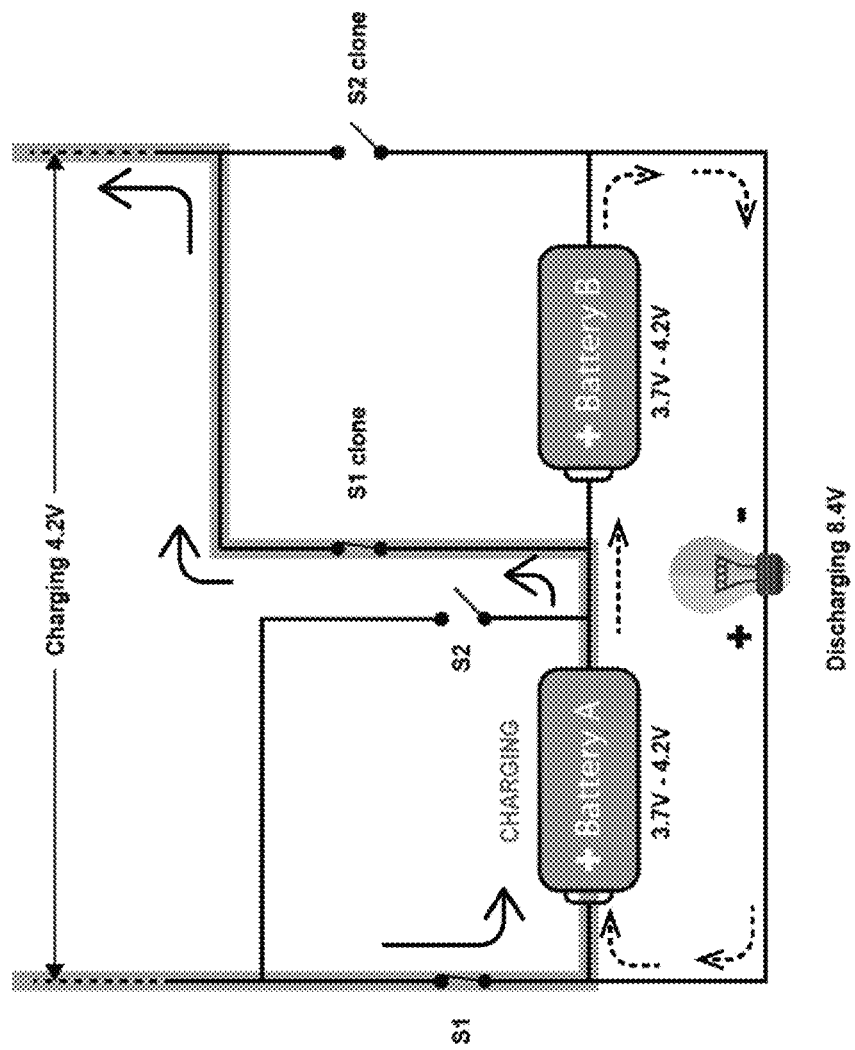
FIG. 3A is an exemplary embodiment where Battery A is charging

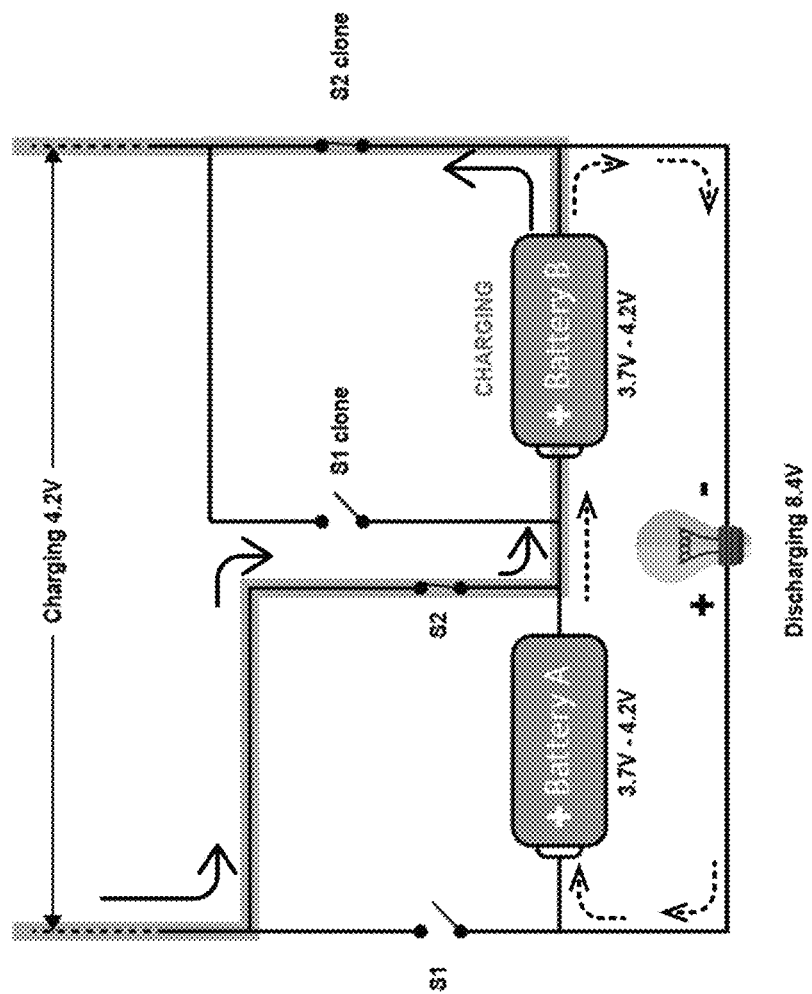
FIG. 3B is an exemplary embodiment where Battery B is charging

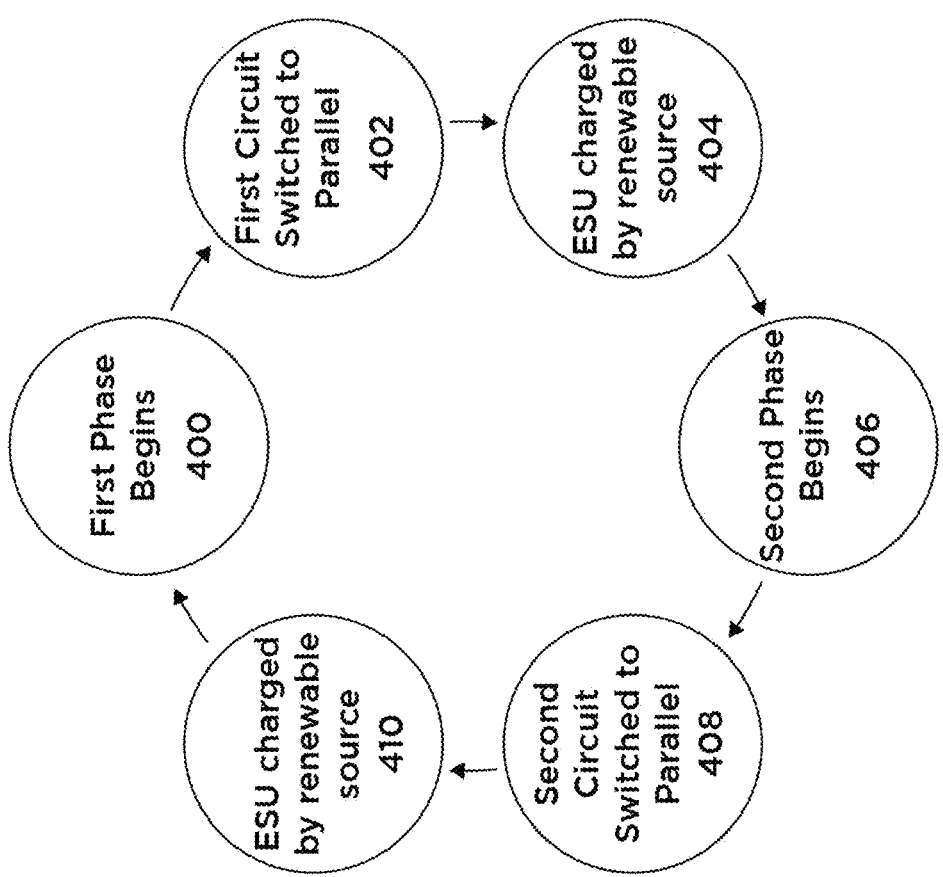
FIG. 4 is an exemplary embodiment of implementing a parallel input switching circuit.

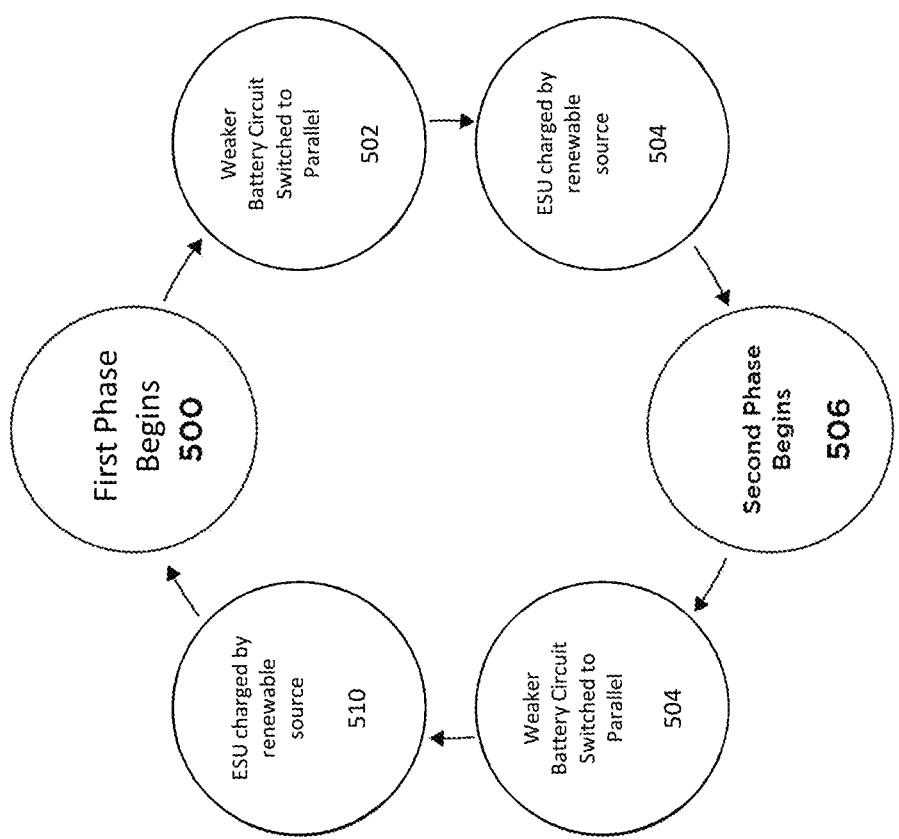
FIG. 5 is an alternative embodiment of implementing a parallel input switching circuit.

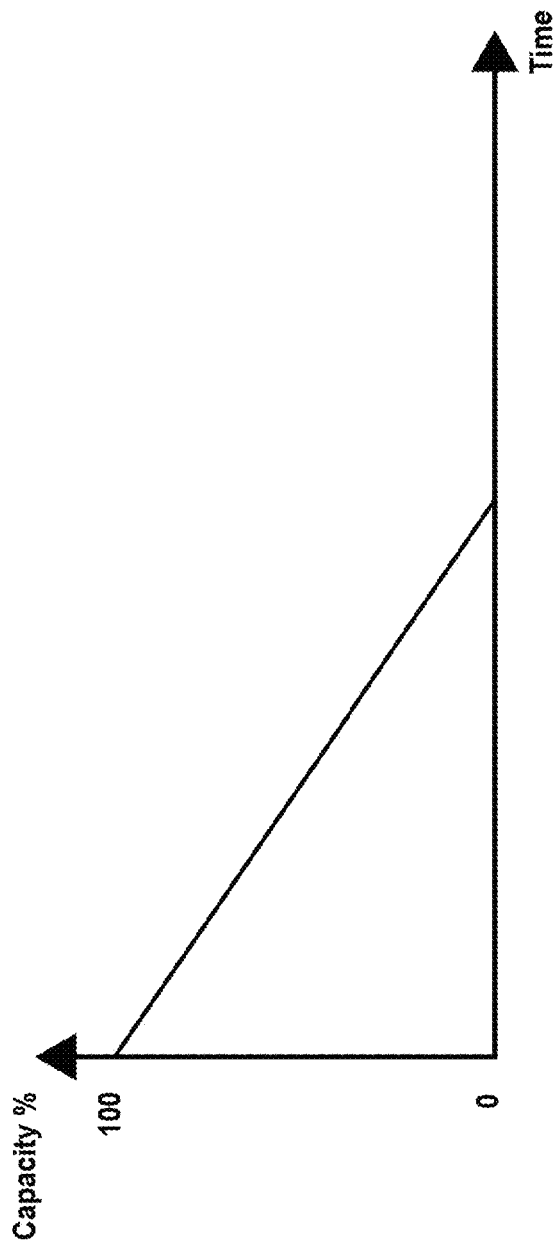
FIG. 6A shows the Discharge (D) cycle in a typical series-stacked battery system.

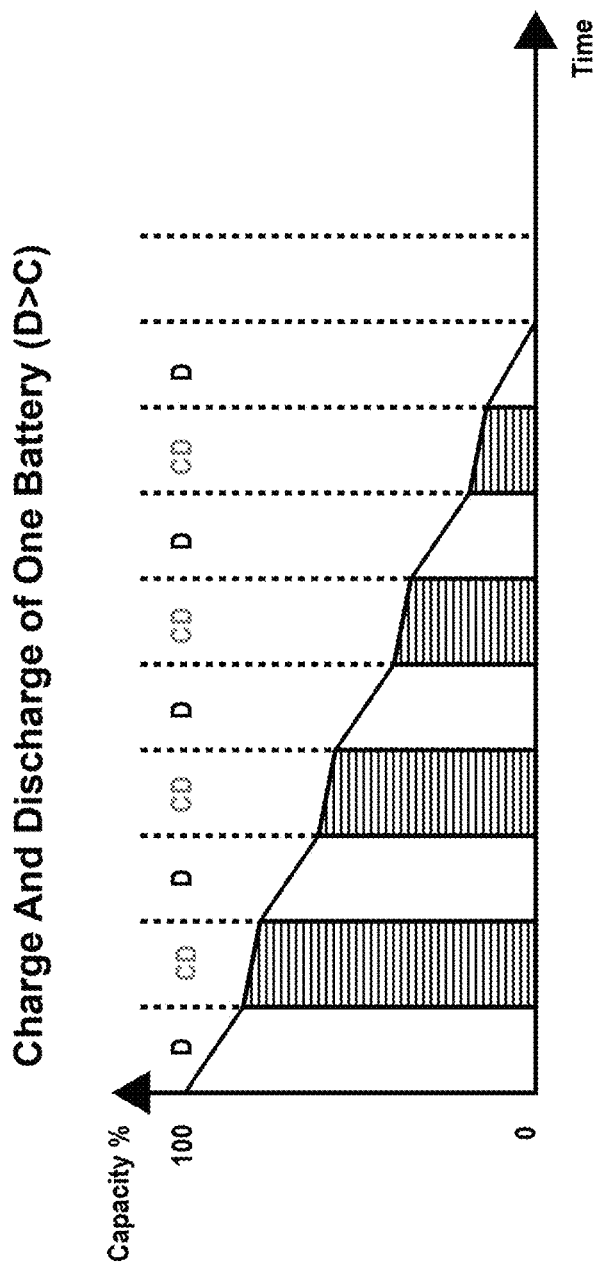
FIG. 6B shows the Discharge (D) and Charging/Discharging (CD) cycles in an exemplary 2-battery embodiment.

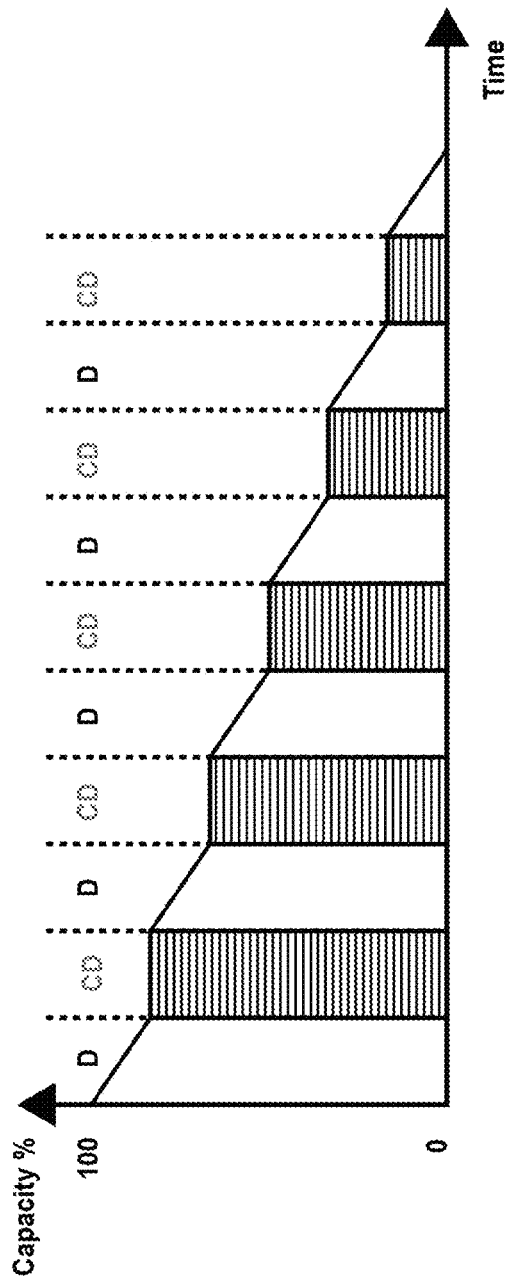
FIG. 6C shows the Discharge (D) and Charging/Discharging (CD) cycles in an exemplary 2-battery embodiment.

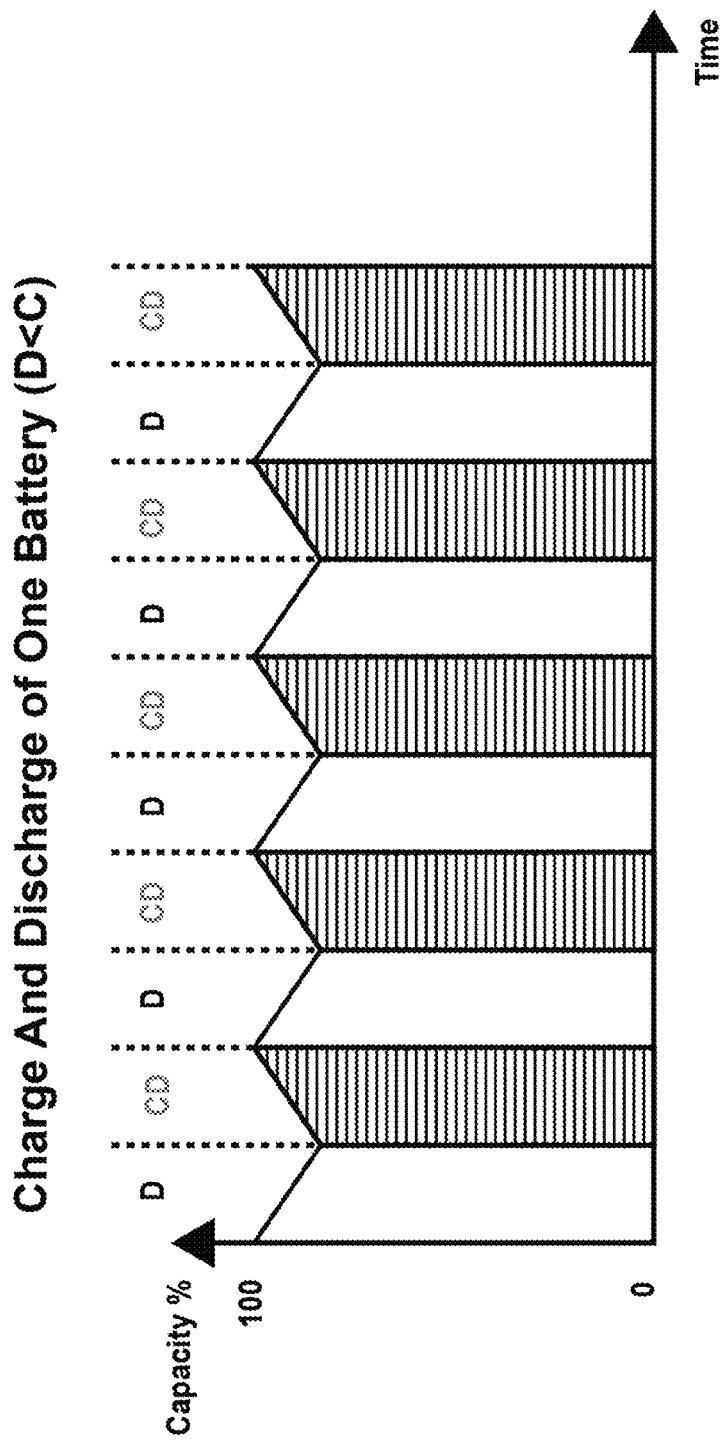
FIG. 6D shows the Discharge (D) and Charging/Discharging (CD) cycles in an exemplary 2-battery embodiment.

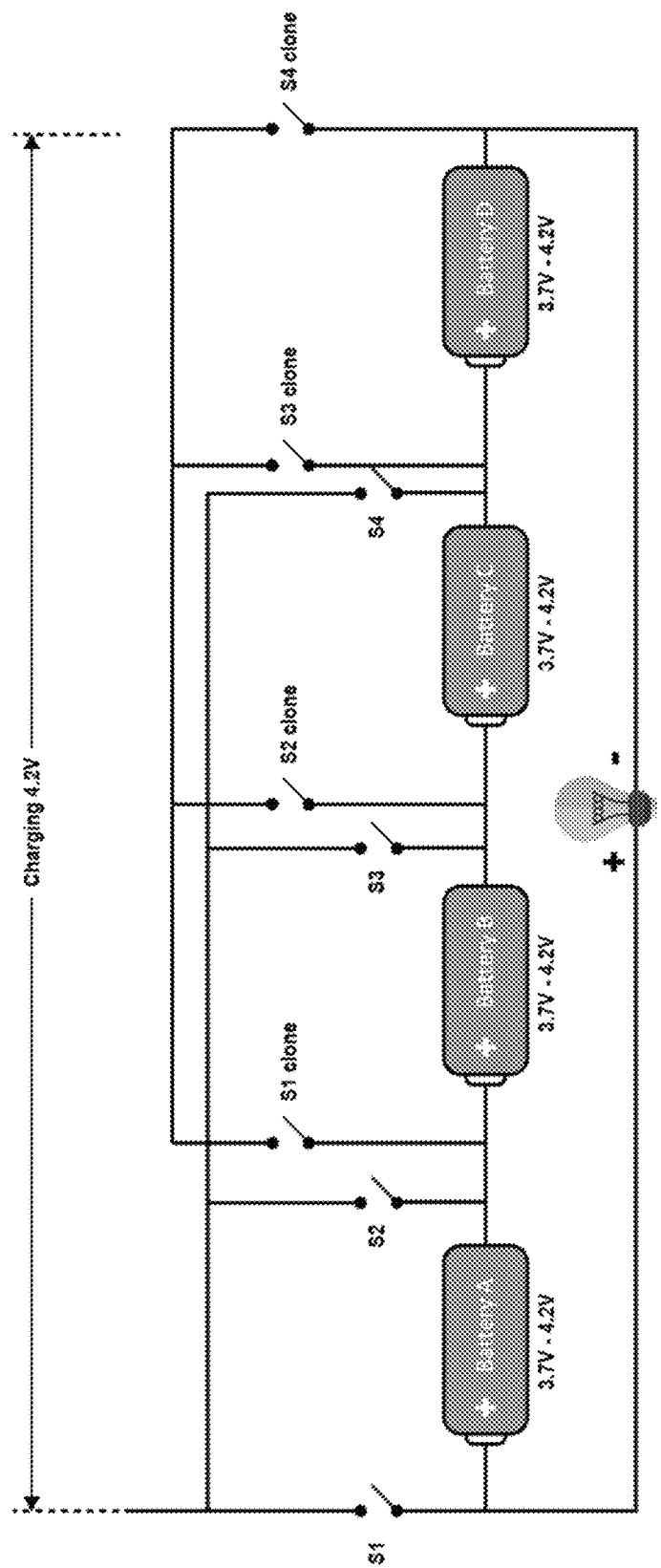
FIG. 7A is an exemplary 4-battery embodiment

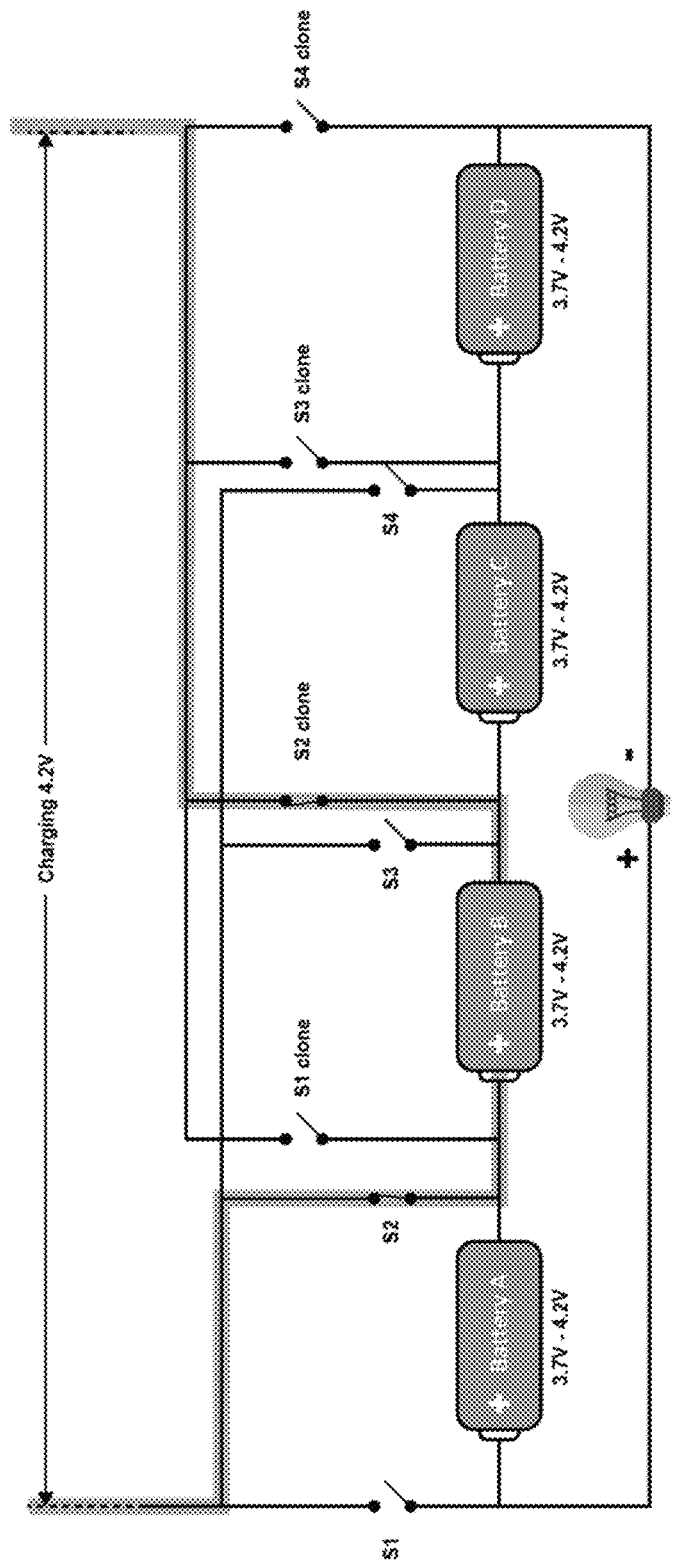
FIG. 7B is an exemplary embodiment where Battery 2 is charging

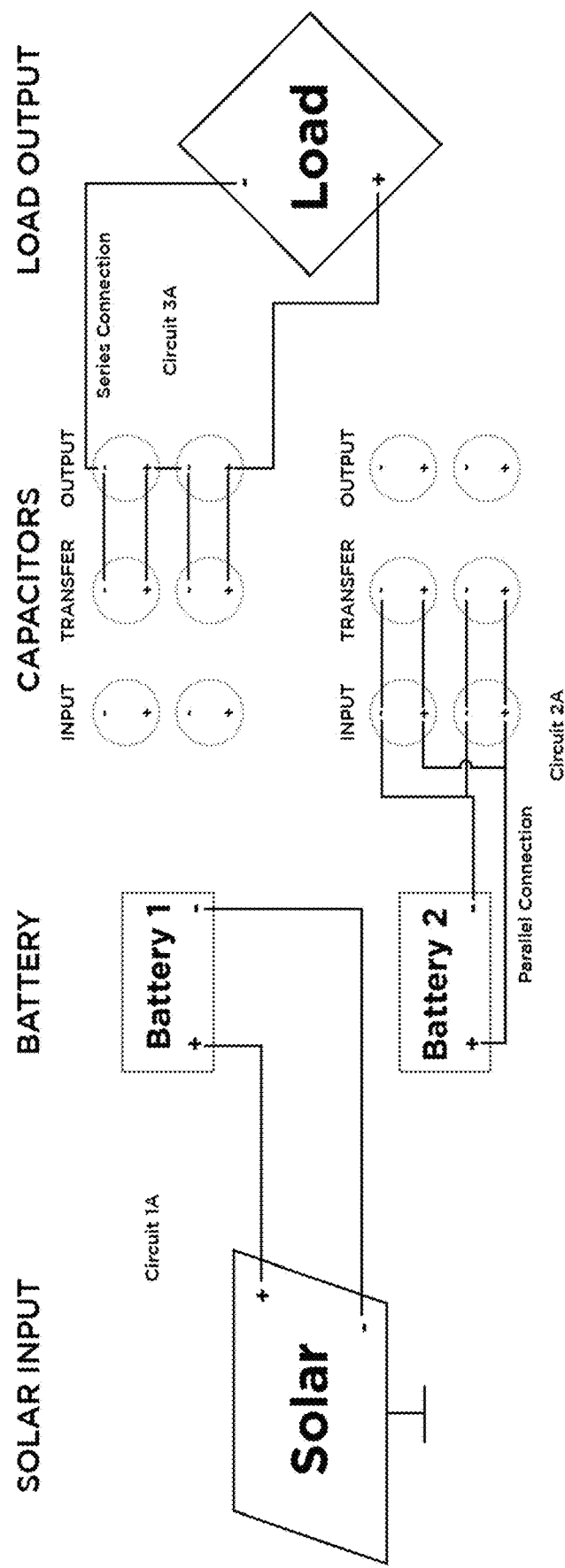
FIG. 8A is a twin battery system using capacitors where Battery 1 is charged

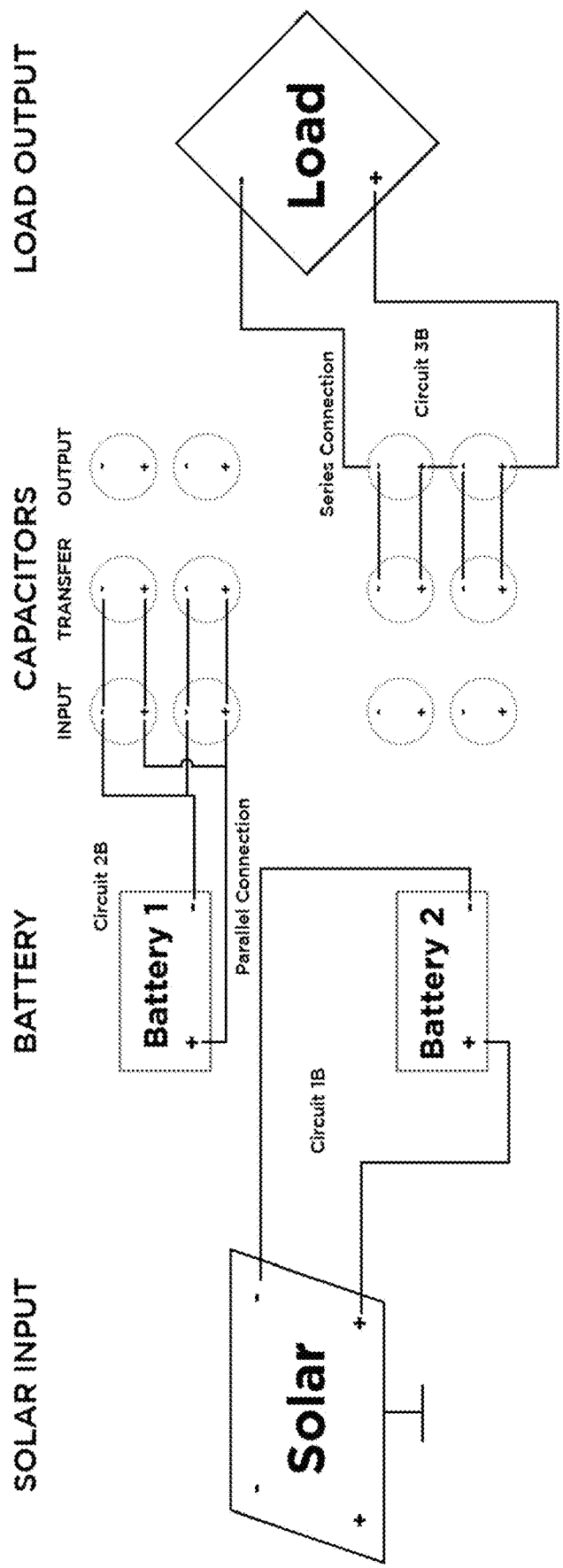
FIG. 8B is a twin battery system using capacitors where Battery 2 is charged

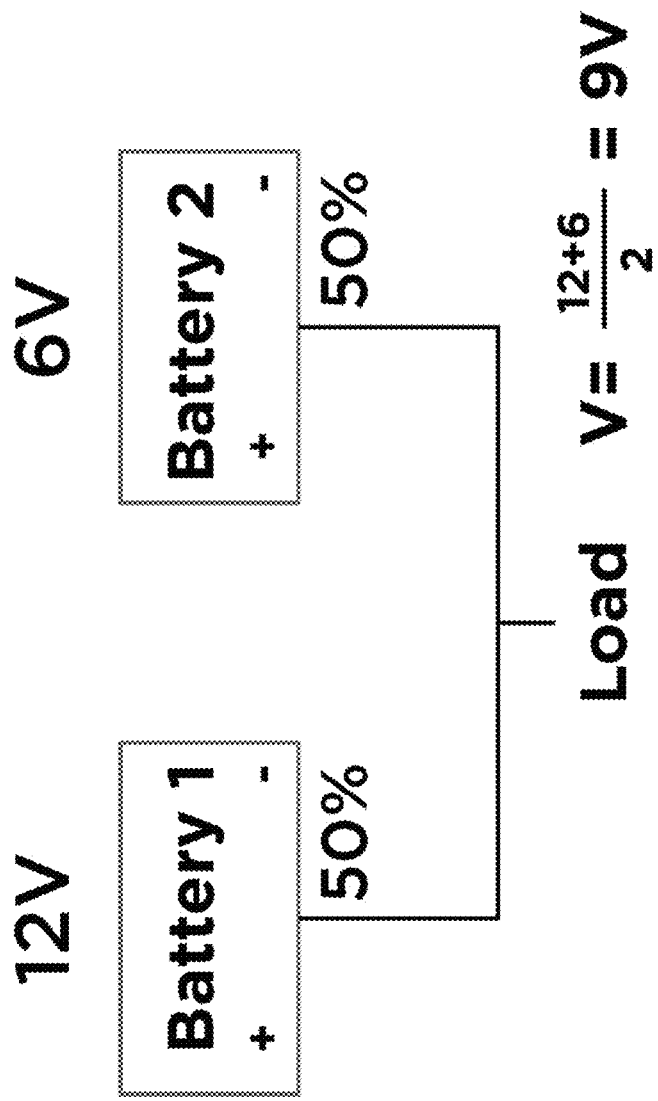
FIG. 9 is an exemplary isolated asymmetrical twin battery system using 50-50 duty-cycle to supply an average voltage to the load.

SIMULTANEOUS PARALLEL CHARGING IN UNINTERRUPTIBLE SERIES DISCHARGING ENERGY STORAGE SYSTEMS

CROSS-REFERENCE TO RELATED APPLICATION

The present patent application claims benefit and priority to U.S. Provisional Patent Application No. 63/429,623 entitled "Method of Charging and Discharging Batteries Simultaneously Based on Battery Configuration" filed on Dec. 2, 2022 which is hereby incorporated by reference into the present disclosure.

FIELD OF THE INVENTION

The present invention relates to the field of energy storage systems, and in particular, to a method for simultaneous parallel charging within uninterrupted series discharging of batteries through the utilization of low-frequency switching.

BACKGROUND OF THE INVENTION

Series and parallel connections are commonly known to connect any number of energy storage units such as batteries or solar photovoltaic cells. The natural connection for batteries is in parallel as it enables cell balancing whereas series method is preferred by manufacturers to enable battery voltage to be higher than the load voltage.

The disadvantage of fixed battery connections such as parallel and series is that it does not provide for voltage transformation which leads to overdesigned systems for both the battery storage and the load. For instance, a 24V solar panel would likely be dangerous for a battery system of 12V as the battery system is not able to transform its voltage and hence the battery voltage would be overdesigned to near 24V instead. This leads to solar technology being inefficient when coupled with MPPT (Maximum Power Point Tracking) devices or other solar controllers which shut off during high irradiance and low irradiance.

In various applications, it is essential to provide a continuous and reliable source of electrical power. This often requires the use of batteries that must be periodically charged while still providing power to a load. Traditional methods for accomplishing this involve interrupting the power supply during the charging process, leading to downtime and inefficiency.

A battery converts energy stored in the chemical bonds of a material into electrical energy via a set of oxidation/reduction (redox) reactions. Redox reactions are chemical reactions in which an electron is either required or produced by the chemical reaction. For primary batteries, this is a one-way process as the chemical energy is converted to electrical energy, but the process is not reversible and electrical energy cannot be converted to chemical energy. This means that a primary battery cannot be recharged. Examples of primary batteries are alkaline consumer batteries used in flashlights, etc.

In a secondary battery, the conversion process between electrical and chemical energy is reversible, as the chemical energy is converted to electrical energy, and electrical energy can be converted to chemical energy, allowing the battery to be recharged. For photovoltaic systems, all batteries used must be rechargeable or secondary batteries. Common examples of secondary batteries are lead acid batteries and lithium-ion batteries used in higher power consumer electronic equipment such as computer laptops, camcorders, mobile phones, and some digital cameras.

The redox reactions which comprise a particular battery system define many fundamental parameters of the battery system. Other key battery properties, including battery capacity, charging/discharging performance and other practical considerations are also influenced by the physical configuration of the battery, for example the amount of material in the battery or the geometry of the electrodes. The battery characteristics such as voltage behavior, battery efficiency, battery non-idealities (self-discharge, degradation of battery capacity, etc.) are dependent on the operation of the redox reactions as well as the battery configurations.

The prior art specifications in U.S. Pat. No. 11,398,735B2 by the same inventor are included herein as reference. These specifications describe a battery system utilizing an electronic battery connection method, alternating between parallel and series duty cycles using high frequency switching, vis-a-vis providing an interruptible power supply to the load. This dynamic configuration is controlled by a microcontroller, allowing for the generation, and averaging of voltage levels based on the parallel-series duty cycle.

SUMMARY OF THE INVENTION

A solution to the challenge of maintaining uninterrupted power supply to the load while charging batteries simultaneously from a power source such as renewable energy. This is achieved by arranging batteries in a series-pack configuration connected to the load and allowing parallel charging of a subset of batteries, from a power source, within the series-pack. The incorporation of interchangeability using low frequency switching ensures a seamless and uninterrupted flow of electrical energy.

BRIEF DESCRIPTION OF THE DRAWINGS

FIG. 1A is an exemplary embodiment of a DPDT switch (Off State) used to charge a series-stacked battery system to power 24V load using a 12V power source.

FIG. 1B is an exemplary embodiment of a DPDT switch (First Position) used to charge a series-stacked battery system to power 24V load using a 12V power source.

FIG. 1C is an exemplary embodiment of a DPDT switch (Second Position) used to charge a series-stacked battery system to power 24V load using a 12V power source.

FIG. 2 is a water tank analogy to illustrate the integrated charging and balancing.

FIG. 3A is an exemplary embodiment of a 2-battery system where Battery A is charging.

FIG. 3B is an exemplary embodiment of a 2-battery system where Battery B is charging.

FIG. 4 is an exemplary embodiment of implementing a parallel input switching circuit.

FIG. 5 is an alternative embodiment of implementing a parallel input switching circuit.

FIG. 6A shows the Discharge (D) cycle in a typical series stacked battery system.

FIG. 6B shows the Discharge (D) and Charging/Discharging (CD) cycles in an exemplary 2-battery embodiment.

FIG. 6C shows the Discharge (D) and Charging/Discharging (CD) cycles in an exemplary 2-battery embodiment.

FIG. 6D shows the Discharge (D) and Charging/Discharging (CD) cycles in an exemplary 2-battery embodiment.

FIG. 7A is an exemplary 4-battery embodiment.

FIG. 7B is an exemplary 4-battery embodiment where Battery 2 is charging.

FIG. 8A is a twin battery system using capacitors where Battery 1 is charged.

FIG. 8B is a twin battery system using capacitors where Battery 2 is charged.

FIG. 9 is an exemplary isolated asymmetrical twin battery system using duty-cycle to supply an average voltage to the load.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

FIG. 1A illustrates an exemplary embodiment of an off-state DPDT (double pole double throw) switch, utilized for charging a series-stacked battery system that powers a 24V direct current (DC) load via a 12V power source. In this configuration, two 12V batteries are arranged in series, to form an output series circuit configuration, to provide energy to the 24V DC load. This battery system is configured to facilitate charging of Battery A (and Battery B alternately) while allowing simultaneous discharging.

FIG. 1B illustrates the charging mode for Battery A where the power source establishes a parallel connection with Battery A, to form a first input parallel circuit configuration. The DPDT switch is positioned at the first position, while the batteries remain connected in series to the 24V load.

FIG. 1C illustrates the charging mode for Battery B where the power source is connected in parallel with Battery B, with the DPDT switch set to the second position, to form the second input parallel circuit configuration, while the batteries remain connected in series to the 24V load.

During the off-state (FIG. 1A), both Battery A and Battery B are disconnected from the power source, and they are also isolated from the 24V load. The DPDT switches maintain load isolation in each of the three states in FIG. 1. When either Battery A or Battery B is charging, despite being connected to the 24V load and discharging, a balance is maintained due to the synchronized current flow, functioning akin to a harmonious water flow system where the load drains the water out completely and new water flows in to complete the water flow cycle.

Electricity flow can be compared with water flow to illustrate the difference between a fixed battery connection method based on either parallel or series where the battery merely has a tap-like function represented by the "on" or "off" buttons which merely turns the tap to enable electricity to flow or to stop the flow with an off switch. A water tank therefore needs to be located on the top floor of the building to enable water to flow downwards to the occupants of a building. A typical battery system works similarly but may be combined with a battery swapping type of technology which is akin to changing water tanks on the top floor.

FIG. 2 depicts a water tank analogy to illustrate an integrated charging and balancing technique, emphasizing the marginal charging of the weakest battery. In this depiction, the solar panel is responsible for marginally charging the less robust battery within the two-battery system. Concurrently, the load is connected in a series configuration to the two-battery system, all the while receiving a marginal charge.

FIGS. 3A and 3B is an exemplary two-battery embodiment featuring Battery A and Battery B, which are typical 3.7V lithium batteries (with a maximum voltage of 4.2V) which are connected in series to discharge power to an 8.4V bulb. Battery A and Battery B take turns being simultaneously charged at 4.2V from a DC power source while supplying power to the 8.4V load. The circuit comprises four transistor switches or mechanical relays denoted as S1, S2, S1Clone, and S2Clone, with S1 and S1Clone operating in unison, while S2 and S2Clone operate simultaneously. When S1 and S1Clone switches are closed, Battery A is charged (FIG. 3A) using a 12V power source, and when S2 and S2Clone are closed, Battery B is charged (FIG. 3B) by the same 12V power source, all while Battery A and Battery B remain connected in series to drive a 24V load. The embodiment may be implemented using a control unit consisting of a group of DPDT switches or at least one other type of switch for simultaneously activation or using other types of mechanical switches that may be programmable, or even electronic or transistor switching enabled using a printed circuit board (PCB) or other types of integrated circuit chip and microcontrollers.

FIG. 4 is an exemplary method for implementing a switching parallel charging circuit, such as the circuit in FIGS. 3A and 3B, where a control unit may regulate a cycle comprising a first phase and second phase. In a first step, the first phase may begin 400 by sending a signal to the switches using a first input parallel configuration 402 which charges the first energy storage unit 404 from the power source such as renewable energy. In the next phase, the second step begins 406 where switches may be flipped 408 such that it uses the second input parallel configuration to charge the second energy storage unit 410 using the same power source. The control unit may flip the switches simultaneously. The switches may be connected to one another such that they are flipped at the same time. The switches may be controlled by a control unit and may be flipped at the same time as the other switches. The first and second phase may be different durations. Alternatively, the first energy storage unit may be interchanged for the second energy storage unit to begin the phases. The control unit may be configured to start the second phase after a certain amount of time, depending on how long the first phase is. After a predetermined period of time, the first phase may once again begin 400 and a new cycle may start. In this exemplary embodiment, both the first and second energy storage units may continue discharging to the load connected in series configuration.

In an alternative embodiment depicted in FIG. 5, the implementation incorporates the use of a voltage comparator circuit to assess whether the first energy storage unit or the second energy storage unit should be prioritized for the initial charging cycle. This determination is based on identifying the weaker battery within the series-stacked configuration. Prioritizing the charging of the weaker battery is beneficial, as it ensures that both the first energy storage unit and the second energy storage unit attain a similar state of charge. This alignment enhances their overall efficiency during uninterrupted discharge to the load. Given that each battery possesses unique characteristics and may discharge at varying rates, the weaker battery within the energy storage system is identified as the one that has experienced a more significant energy loss. Consequently, it is selected for simultaneous recharging, facilitating both marginal charging and integrated charging and balancing of the energy storage system. This integrated approach ensures a seamless supply of uninterruptible power to the DC load including an AC load using inverters.

In the first step, the process begins by sending a signal to the switches via a first input parallel configuration 502. This configuration is responsible for charging the weaker energy storage unit 504 from a renewable energy power source. The determination of the weaker battery is made using voltage comparators, which subsequently send the signal to the switches.

In the next phase, the second step begins 506 where switches may be flipped 508 such that it uses the second input parallel configuration to charge the weaker energy storage unit 510 using the same power source. If the same battery is the weaker battery, the first phase continues until such time that the second (or other batteries in the energy storage system) become the weakest. The control unit may be configured to start the second phase after a certain amount of time, depending on how long the first phase is. After a predetermined period of time, the first phase may once again begin 500 and a new cycle may start.

Charging in parallel can be implemented in different ways. One approach involves selectively charging only one or a specific group of batteries from the entire set. Alternatively, the batteries can be divided into smaller groups, such as Group A (first energy storage unit) and Group B (second energy storage unit) in a series pack of two or more even numbered batteries, and these groups can be charged at separate times including using an algorithm to enable cell balancing and overall improvement using a microcontroller. Battery systems of higher capacity (measured in ampere-hours, Ah), may also use extremely slow or low frequency switching for charging and marginal balancing can be adjusted to approximately once every 15 minutes. It may be contemplated that the switching speed may be lower than 0.1 Hertz (Hz) to facilitate the charging of each battery Group A or Group B whereas a slightly higher switching speed may be required when the battery capacity is low to implement marginal charging to balance and improve the efficiency of the battery pack.

Slower switching intervals reduce the occurrence of high electromagnetic interference (EMI), which can disrupt other equipment and daily life. If the battery system has sufficiently high Ah, even slower switching intervals, such as once every hour, can be employed. It is important to note that most batteries perform optimally within a specific capacity range, typically between 30% and 80%, and adjusting the switching speed helps match the battery manufacturer's specifications to prolong battery life.

The charging process for the batteries occurs simultaneously, resulting in an integrated charging and balancing (ICB) system. This approach is preferable to a conventional battery management system (BMS), which relies on more complex circuits to achieve balance. The parallel mode used in the present invention allows for effective balancing during the off-mode, as the batteries remain in a parallel configuration.

FIG. 6 provides an overview of the customary charging and discharging patterns observed in the two-battery system in FIG. 3. In FIG. 6A, we observe the typical discharge of series-stacked battery systems, wherein the capacity or state of charge gradually diminishes over time. FIG. 6B illustrates the charge and charge/discharge dynamics of a single battery, with the discharge (D) exceeding the charge (C). Conversely, in FIG. 6C, the charge (C) and charge/discharge (D) are balanced, while FIG. 6D showcases a scenario where the charge (C) surpasses the charge/discharge (CD). The preferred outcome is represented by FIG. 6D, where the higher charge effectively offsets the discharge, resulting in regenerative charging to replace the lost energy.

In a series battery pack, individual cells inherently possess slightly varying capacities. Consequently, during the course of charge and discharge cycles, they may reach different states of charge. When multiple batteries are connected in series, the collective voltage experiences fluctuations, rendering it unsteady, which, in turn, adversely impacts the overall efficiency of the energy system.

To counteract this issue and enhance system efficiency, a dual approach is employed. First, charging in parallel is implemented to recuperate the lost energy by allowing for marginal charging. Simultaneously, cell balancing is maintained to ensure the uniformity of the battery pack. Additionally, periodically bringing a subset of batteries into a parallel circuit further contributes to battery balancing and, consequently, system optimization.

Although the previous examples may implement a switching circuit involving two batteries, it may be contemplated that the batteries may instead be any component that a user desires as an energy storage unit which is configured to supply uninterruptible power to the load while one of the energy storage units is being recharged continuously using an available power source. Further two batteries were used in the previous examples for the sake of clarity, but any number of batteries may be interconnected in a similar manner. The additional batteries may be configured to operate in additional (more than two) phases. The output may be any desirable output, such as another battery or any other component capable of receiving an input.

FIGS. 7A and 7B are exemplary embodiments of a four-battery system illustrating the possibility that it could be expanded to further than the two-battery system of FIGS. 3A and 3B. FIG. 7B depicts that Battery B is charged when S2 and S2Clone switches are closed where the other switches such as S3 and S3Clone and S4 and S4Clone enable the charging of Battery C and Battery D respectively.

A battery pairing method may be integrated into an architecture where twin groups of batteries alternate in powering a load and being charged by a PV panel to ensure an uninterruptible energy storage system to supply power to the load. The two battery groups are constantly isolated from each other and from the load by means of a system of capacitors which transfers the charge from the batteries to the load connecting. This pairing technique has an important advantage in that the two batteries can be different, in terms of capacity and characteristics, or be powered by different renewable sources, without this difference producing imbalances in their connection. The power distribution between the two groups can be dynamically changed, according to the charge level of the respective batteries and further the output load voltage may be higher than the voltage of the power source by configuring capacitors in series to match the load requirement.

FIG. 8A is the first half of an exemplary embodiment of a twin group of batteries with three sets of capacitors: input, transfer, and output capacitors. The input capacitors are connected in parallel to receive charge from the connected battery, while the output capacitors are connected in series to supply higher voltage to the load. To maintain isolation between the input and output capacitors, a transfer capacitor is employed. In this embodiment, Circuit 1A connects the solar power source to Battery 1, and Circuit 2A connects the transfer capacitor to the series-connected output capacitors that supply the load. Battery 2 is connected to the input capacitors, with the transfer capacitor controlled by a switch.

FIG. 8B represents the second half of the exemplary twin-group battery embodiment. In this configuration, Circuit 1B links the solar power source to Battery 2, while Circuit 3B connects the transfer capacitor to the now-series-connected output capacitors responsible for supplying the load. Additionally, Circuit 2A connects Battery 2 to the input capacitors. The uninterrupted power supply to the load is achieved through the utilization of load switches, which alternate the load connection between two power supply groups. This arrangement permits the duty cycle to be distributed between these groups.

FIG. 9 illustrates an exemplary duty cycle between Battery 1 and Battery 2, wherein the cycle can be divided equally, i.e., 50%, between the two groups. In this configuration, with Battery 1 at 12V and Battery 2 at 6V, employing a 50-50 duty cycle results in an average output of 9V to the load.

Alternatively, an asymmetrical distribution is feasible, wherein the load remains connected to the first group for an extended duration and to the second group for a shorter period. It may therefore be contemplated that the duty cycle of the first group may be between 0 to 100% in relation to the second group which will comprise the remaining portion of the duty cycle. In this aspect, the system's output voltage performance relies on rapid switching above 1 kHz to avoid "ripples" as it would otherwise be square waveform.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

I claim:

1. An uninterruptible energy storage system comprising:
a first energy storage unit with a positive and negative terminal,
a second energy storage unit with a positive and negative terminal,
a DC load,
a DC power source,
an output series circuit configuration wherein the first energy storage unit and the second energy storage unit are connected in series to the output series circuit configuration, to supply power to the DC load,
a first input parallel circuit configuration wherein the DC power source is connected to the first energy storage unit, and
a second input parallel circuit configuration wherein the DC power source is connected to the second energy storage unit,
a control unit that regulates a cycle having a duration comprising a first phase and a second phase,
wherein during the first phase, the DC power source connects to the first input parallel circuit configuration,
wherein during the second phase, the DC power source connects to the second parallel circuit configuration, and
wherein the control unit is capable of simultaneously activation and selected from the group consisting of at least one DPDT switch, at least one programmable mechanical switch, and at least one electronic device selected from the group consisting of at least one transistor, at least one printed circuit board, at least one integrated circuit chip, and at least one microcontroller.

2. The uninterruptible energy storage system of claim 1 wherein the first energy storage unit and the second energy storage unit each comprise a plurality of batteries.

3. The uninterruptible energy storage system of claim 1 wherein an amount of energy is lost from the first energy storage unit and the second energy storage unit to the DC load and then recharged from the first input parallel circuit configuration and second input parallel circuit configuration from the DC power source.

4. The uninterruptible energy storage system of claim 1 wherein the control unit is configured to charge the first energy storage unit and the second energy storage unit, enabling integrated charging and balancing of the energy storage system while supplying uninterruptible power to the DC load.

5. The uninterruptible energy storage system of claim 1 wherein the DC power source has a lower voltage than a voltage of the DC load.

6. The uninterruptible energy storage system of claim 1 wherein the DC power source is a renewable energy source.

7. The uninterruptible energy storage system of claim 1 wherein the control unit operates at a low frequency of less than 0.1 Hertz to change phases to prioritize charging of the first energy storage unit and the second energy storage unit.

8. The uninterruptible energy storage system of claim 1 wherein the control unit is configured to detect a voltage from the first energy storage system and the second energy storage system comprising a voltage comparator circuit designed to charge the energy storage unit with the lowest voltage.

9. The uninterruptible energy storage system of claim 1 wherein the first phase has a relative duration to a relative duration of the second phase and the control unit is capable of altering the relative duration of the first phase independent of the relative duration of the second phase, such that the first phase comprises 0% to 100% of the duration of the cycle, and the second phase comprises the remainder of the cycle.

10. The uninterruptible energy storage system of claim 1 further comprising a plurality of switches connected to the positive terminal and to the negative terminal of the first energy storage unit and the second energy storage unit wherein the plurality of switches are capable of configuring the first energy storage unit and the second energy storage unit during the first phase and the second phase.

11. The uninterruptible energy storage system of claim 10 wherein the plurality of switches are interconnected for simultaneous activation.

12. The uninterruptible energy storage system of claim 10 wherein the control unit controls the plurality of switches.

13. An electrical circuit for connecting batteries comprising:

a first energy storage unit with a positive and negative terminal,
a second energy storage unit with a positive and negative terminal,
a DC load,
a DC power source,
an output series circuit configuration wherein the first energy storage unit and the second energy storage unit are connected in series to the output series circuit configuration to supply power to the DC load,
a first input parallel circuit configuration wherein the DC power source is connected to the first energy storage unit, and
a second input parallel circuit configuration wherein the DC power source is connected to the second energy storage unit,
a control unit that regulates a cycle having a duration comprising a first phase and a second phase,
wherein during the first phase the DC power source connects to the first input parallel circuit configuration,
wherein during the second phase the DC power source connects to the second parallel circuit configuration, and
wherein the control unit is capable of simultaneously activation and selected from the group consisting of at least one DPDT switch, at least one programmable mechanical switch, and at least one electronic device selected from the group consisting of at least one transistor, at least one printed circuit board, at least one integrated circuit chip, and at least one microcontroller.

14. The electrical circuit of claim 13 wherein the first energy storage unit and the second energy storage unit each comprise a plurality of batteries.

15. The electrical circuit of claim 13, further comprising a plurality of switches connected to the positive terminals and the negative terminals of the first energy storage unit and the second energy storage unit wherein the plurality of switches are capable of configuring the first input parallel circuit configuration and the second input parallel circuit configuration during the first phase and the second phase when the plurality of switches are connected to the DC power source.

16. The electrical circuit of claim 13 wherein the plurality of switches are interconnected for simultaneous activation.

17. The electrical circuit of claim 13 wherein the control unit controls the plurality of switches.

18. An uninterruptible energy storage system, comprising:
a first energy storage unit with a positive and negative terminal,
a second energy storage unit with a positive and negative terminal,
a DC load,
a DC power source,
a first set of input capacitors,
a second set of transfer capacitors,
a third set of output capacitors,
a control unit that regulates a cycle comprising a first phase and a second phase,
wherein during the first phase, the first energy storage unit charges using the DC power source, and the load receives charge from the connected transfer capacitors configured in series with the output capacitors, while being electrically isolated from the DC load as it is disconnected from the input capacitors, and the second energy storage unit is connected to the input capacitors and transfer capacitors in parallel configurations,
wherein during the second phase, the second energy storage unit charges using the DC power source, and the load receives charge from the connected transfer capacitors configured in series with the output capacitors, while being electrically isolated from the DC load as it is disconnected from the input capacitors, and the first energy storage unit is connected to the input capacitors and transfer capacitors in parallel configurations, and
wherein the control unit is capable of simultaneously activation and selected from the group consisting of at least one DPDT switch, at least one programmable mechanical switch, and at least one electronic device selected from the group consisting of at least one transistor, at least one printed circuit board, at least one integrated circuit chip, and at least one microcontroller.

19. The uninterruptible energy storage system of claim 18 wherein the first energy storage unit and second energy storage unit have different voltage and capacitance, and wherein the duty cycle determines the average voltage supplied to the DC load.

* * * * *